United States Patent [19]

Tokar et al.

[11] 4,219,363

[45] Aug. 26, 1980

[54] PROCESS FOR THE PREPARATION OF PORTLAND CEMENT CLINKER

[76] Inventors: Vladimir A. Tokar, ulitsa Revoljutsionnaya, 65, kv. 6; Maria I. Zubik, ulitsa Postysheva, 9, kv. 35, both of Krivoi Rog; Grigory M. Baklanov, ulitsa Kirova 34a, kv. 54, Kiev; Nikolai F. Matygin, Krivoi Rog.; Valentin S. Ustinov, ulitsa Gorkogo, 9, kv. 20; Anatoly V. Kolesnikov, ulitsa Raevskogo, 3, kv. 114, both of Moscow; Stanislav I. Gashenko, ulitsa Gorkogo, 159, kv. 76, Zaporozhie; Alexandr A. Rogatkin, ulitsa 40 let Sovetskoi Ukrainy, 76, kv. 3, Zaporozhie; Leonid P. Khlopkov, ulitsa 40 let Sovetskoi Ukrainy, 24, kv. 11, Zaporozhie; Vera I. Mikheeva, ulitsa Patrioticheskaya, 58, kv. 115, Zaporozhie; Lidia I. Lekalova, ulitsa 40 let Sovetskoi Ukrainy, 58, kv. 39, Zaporozhie; Nikolai F. Drepin, ulitsa Suvorava, 13, kv. 141, Kiev; Lev P. Feofanov, ulitsa 40 let Sovetskoi Ukrainy, 82, kv. 130, Zaporozhie; Nina E. Khodotova, ulitsa Revoljutsionnaya, 73, kv. 23; Ivan I. Shevchenko, ulitsa Revoljutsionnaya, 67, kv. 5, both of Krivoi Rog; Larisa A. Telina, ulitsa Nemirovicha-Danchenko, 14, Zaporozhie; Vladimir I. Garmash, ulitsa Juzhno-Ukrainskaya, 19, kv. 50, Zaporozhie; Andrei M. Frantsevich, ulitsa 40 let Sovetskoi Ukrainy, 76a, kv. 12, Zaporozhie, all of U.S.S.R.

[21] Appl. No.: 946,974

[22] Filed: Sep. 29, 1978

[51] Int. Cl.$^2$ ............................................. C04B 7/24
[52] U.S. Cl. ................................. 106/100; 106/103; 106/118
[58] Field of Search ................. 106/97, 100, 103, 118

[56] References Cited

U.S. PATENT DOCUMENTS

| | | | |
|---|---|---|---|
| 1,183,255 | 5/1916 | Van der Toorn | 106/97 |
| 1,555,405 | 9/1925 | Eckel | 106/100 |
| 4,111,711 | 9/1978 | Kiehl et al. | 106/97 |

*Primary Examiner*—G. O. Peters
*Attorney, Agent, or Firm*—Ladas, Parry, Von Gehr, Goldsmith & Deschamps

[57] ABSTRACT

A process for the preparation of Portland cement clinker resides in that limey, clayey and iron-containing components are ground together. The mix is then homogeneized pelletized, decarbonized at 800° to 1000° C. and roasted at 1200° to 1350° C. Dust sublimates—wastes of the titanium production—are added at the stage of grinding or homogeneization in an amount of 0.5 to 6.0% by total weight of raw mix, and, in case the dust sublimates are added at the homogeneization stage, an aqueous suspension of cakes—wastes of the titanium and magnesium production—is added at the pelletizing stage, at a volumetric ratio of water to cakes of 3–6:1, and in an amount of 10 to 14% by total weight of raw mix.

The process according to the invention enables the preparation of clinker exhibiting an improved strength. With the process according to the invention, the degree of decarbonization of raw mix is as high as 35–50%, and roasting temperature is 120°–150° C. lower.

2 Claims, No Drawings

PROCESS FOR THE PREPARATION OF PORTLAND CEMENT CLINKER

The invention relates to the processes for the preparation of portland cement clinker.

FIELD OF THE ART

This portland cement clinker is widely used for the production of high-grade cements to be used in all construction jobs, such as in house building, bridge construction, implementation of industrial and water engineering projects, and the like.

BACKGROUND OF THE INVENTION

Stringent requirements are imposed on portland cement clinker. It should exhibit a complex of certain physical and mechanical properties. Improvement of quality of portland cement clinker mainly depends on the improvement of manufacturing process of its production, intensification of production processes, development of radically new, more efficient and economical methods for the production of portland cement clinker.

In the production of portland cement clinker, the composition of raw materials, methods of preparing raw materials, processes of decarbonization and roasting of raw mixes are of a predominant importance.

Known in the art are various processes for the preparation of portland cement clinker which differ by the composition of raw mix, method of batching and homogeneization, binder material used for pelletizing, gasodynamic and temperature conditions, various production steps used in carrying out the process, and a number of other features.

Known in the art is a process for the preparation of portland cement clinker, wherein the process of manufacture is intensified by modifying the steps of the process grinding and homogeneization of raw mix are performed in the decarbonization zone of a rotary kiln.

In another process for the preparation of portland cement-clinker, in order to intensify the clinker formation process and accelerate the decarbonization processes, additional steps are used: thus fuel is additionally burnt in the layer of material in the decarbonization zone, and the decarbonized mix is abruptly heated to 1400°–1500° C.

However, these processes are associated with a low degree of decarbonization and high-temperature roasting conditions.

Known in the art is also a process for the preparation of portland cement clinker by grinding limey, clayey and iron-containing components to obtain a mix which is homogeneized and pelletized to produce pellets of 8 to 12 mm size with a moisture content from 12 to 15%. The material is then decarbonized on a calcination grate at 800° to 1000° C. The material is subsequently fed to a roasting kiln. The roasting is effected at 1450° to 1500° C.

This process is characterized by high thermal efficiency, however, in conducting the process, the resultant clinker exhibits inadequate strength because the process cannot ensure the production of high-strength pellets, and rather low degree of decarbonization is achieved. Besides, the process features high roasting temperature and specific fuel consumption.

SUMMARY OF THE INVENTION

It is an object of the invention to provide a process for the preparation of portland cement clinker, which enables the production of clinker exhibiting an improved degree of decarbonization and sufficiently high strength at lower roasting temperature.

In accordance with this and other objects, the invention resides in that in a process for the preparation of portland cement clinker according to the invention, comprising grinding limey, clayey and iron-containing components to obtain a mix which is subsequently homogeneized, decarbonized at 800° to 1000° C., and roasted, according to the invention, dust sublimates—wastes of titanium production—are added at the grinding or homogeneization stage in an amount of 0.5 to 6.0% by total weight of raw mix, and the roasting is conducted at 1200° to 1350° C., and, in case the dust sublimates are added at the homogeneization stage, an aqueous suspension of cakes—wastes of the titanium and magnesium production—being added at the pelletizing stage in an amount of 10 to 14% by total weight of raw mix, at a ratio of water to cakes of 3–6:1.

Dust sublimates comprise a finely dispersed mixture of chlorides of a size from 10 to 100 m and have the following composition in % by weight (in terms of oxides and elements):

| | |
|---|---|
| $TiO_2$ | 2.0–10.0 |
| $FeO$ | 3.0–20.0 |
| $Mn$ | 2.0–5.0 |
| $SiO_2$ | 4.0–15.0 |
| $Al_2O_3$ | 2.0–12.0 |
| $CaO$ | 1.0–3.0 |
| $MgO$ | 0.7–4.0 |
| $Cr_2O_3$ | 1.7–4.0 |
| $V_2O_5$ | 0.05–4.0 |
| $Cl$ | 11.0–35.0 |
| $C$ | 10.0–25.0 |

The mixture also includes a small amount of rare-earth elements.

The presence of finely dispersed carbon (petroleum coke) in the chlorines ensures good heat conductance of the mix since carbon heats the mass through when burnt over the entire volume. The presence of chlorides of Ca, Fe and others (sublimation temperature above 300° C.) provides for a solid-phase decarbonization at temperatures as low as 300° to 500° C.

Adding dust sublimates in an amount smaller than 0.5% by total weight of raw mix at the grinding stage cannot ensure an improvement of the degree of decarbonization and does not lower the roasting temperature, while the use of more than 6% by weight is economically unwarranted.

In case dust sublimates are added at the homogeneization stage, certain components of the dust sublimates react with carbonates of raw mix. This results in a better degree of decarbonization.

Aqueous suspension of cake added at the pelletizing stage comprises a paste-like mass with a moisture content of 60 to 80%. The cakes—wastes of the titanium and magnesium production—have the following chemical composition (based on dry mass), % by weight:

| | |
|---|---|
| $C$ | 2.0–6.0 |
| $TiO_2$ | 10.0–13.0 |
| $FeO$ | 2.0–10.0 |

-continued

| | |
|---|---|
| $Al_2O_3$ | 7.0–10.0 |
| $SiO_2$ | 7.0–30.0 |
| CaO | 15.0–30.0 |
| $CaCl_2$ | 5.0–13.0 |
| $CaCO_3$ | 20.0–50.0 |
| MnO | 0.18–30.0 |
| MgO | 5.1–9.0 |
| $V_2O_5$ | 0.12–0.40 |
| $Cr_2O_3$ | 0.30–0.80 |
| S | 0.3–1.5 |
| Cl | 3.0–10.0 |
| water | to 100. |

Owing to the presence of Si, Ca and Al in the composition of cakes, they are a good binder. Their use in the form of an aqueous suspension in an amount from 10 to 14% by total weight of raw mix ensures high strength of pellets which, in turn, contributes to a stability of gasodynamic and temperature conditions during the roasting of pellets.

The selected volumetric ratio of cakes to water, and the amount of the aqueous suspension used are optimum as they ensure a desired strength of pellets, and the mass does not conglomerate at the pelletizing stage.

The process for the preparation of portland cement clinker according to the invention has a number of advantages over the prior art processes. Thus the degree of decarbonization of raw mix attains 35–50% with the process according to the invention, which is 50% greater compared to prior art, and roasting temperature is, respectively, lowered by 120° to 150° C. This results in fuel savings by 17–34%. Through-put capacity of kilns is improved by 11–13%. Moreover, adding an aqueous suspension of cakes at the pelletizing stage enables the production of clinker of higher strength owing to an increased void ratio and strength of pellets which are 3–10% greater.

DETAILED DESCRIPTION OF THE INVENTION

The process is simple in manufacture and is conducted in the following manner.

Finely divided and dried limey component, clayey and iron-containing components, as well as dust sublimates—wastes of the titanium production—are charged into a ball mill. After the grinding, the resultant raw mix is fed to adjusting bins for homogenization, and then, to a plate pelletizer to which water is fed through injection nozzles. As a result, pellets of 8 to 12 mm size are produced. The resultant pellets are then fed to a calcination grate to be decarbonized, after a drying by 35–48% at 700° to 1000° C. Subsequently the pellets are fed to a Lepol kiln having conveyor-type calcinators for roasting at 1200° C. to 1350° C.

In another embodiment dust sublimates—wastes of the titanium production—are fed to adjusting bins, and an aqueous suspension of cakes—wastes of the titanium and magnesium production—is fed to the pelletizing stage, rather than water.

The invention will be better understood from the following specific examples.

EXAMPLE 1

Limestone was preliminarily comminuted in a jaw breaker and then in a hammer mill, then dried to moisture content 5%. Clay was also dried to moisture content 5%. Then the limestone, clay, ore dust and dust sublimates in an amount of 0.5% by total weight of raw mix were charged into a ball mill. The ground mix was fed to adjusting bins for homogeneization to prepare a raw mix of a homogeneous chemical composition. The homogeneous mix was fed to a plate pelletizer, to which water was also fed through injection nozzles. As a result, pellets of 8 to 12 mm size were produced. The pellets were fed to the calcination grate for a heat treatment at 1000° C., the degree of decarbonization being 35%. After decarbonization the pellets fed to a Lepol kiln having conveyor-type calcinators for roasting. The roasting was conducted at 1350° C.

The resultant clinker had a strength of 480 kgf/cm².

EXAMPLE 2

Portland cement clinker was prepared as described in Example 1, but the dust sublimates were fed in an amount of 4% by total weight of raw mix, the temperature of decarbonization of pellets was 900° C., and degree of decarbonization was 40%. Roasting was conducted at 1300° C.

The resultant portland cement clinker had a strength of 495 kgf/cm².

EXAMPLE 3

Portland cement clinker was prepared as described in Example 1, but ore dust was replaced by pyrite cinder, dust sublimates were fed in an amount of 6% by total weight of raw mix, temperature of decarbonization of pellets was 800° C., and degree of decarbonization was 50%. Roasting was conducted at 1200° C. The resultant clinker had a strength of 490 kgf/cm².

EXAMPLE 4

Limestone was ground in a jaw breaker and in a hammer mill, and was then fed for drying to moisture content 5%. Clay was also dried to moisture content 5%. Subsequently, the limestone, clay and ore dust were charged into a ball mill. The comminuted mix and dust sublimates in an amount of 0.5% by total weight of raw mix were fed to adjusting bins for homogeneization to a obtain raw mix of homogeneous chemical composition. The homogeneized mix was fed to a plate pelletizer to which an aqueous suspension of cakes was fed at a volumetric ratio of water to cakes of 3:1, in an amount of 10% by total weight of the raw mix. As a result, pellets of 8 to 12 mm size were produced. The pellets were then fed to a calcination grate for a heat treatment at 1000° C., the degree of decarbonization being 35%. After decarbonization the pellets were fed to a Lepol kiln having conveyor-type calcinators for roasting. Roasting was conducted at 1350° C.

The resultant clinker had a strength of 480 kgf/cm².

EXAMPLE 5

Portland cement clinker was prepared as described in Example 4, but dust sublimates were added in an amount of 3% by total weight of raw mix, decarbonization of pellets was conducted at 900° C., an aqueous suspension of cakes was fed at a volumetric ratio water to cakes of 5:1, in an amount of 11% by total weight of the raw mix, the degree of decarbonization was 42%, and roasting temperature was 1300° C.

The resultant clinker had a strength of 495 kgf/cm².

EXAMPLE 6

Portland cement clinker was prepared as described in Example 4, but dust sublimates were fed in an amount of 6% by total weight of raw mix, pellet decarbonization temperature was 800° C., an aqueous suspension of cakes was fed at a volumetric ratio of water to cakes of 6:1, in an amount of 14% by total weight of the raw mix, the degree of decarbonization was 50%, and roasting temperature was 1200° C.

The resultant clinker had a strength of 540 kgf/cm².

What is claimed is:

1. A process for the preparation of portland cement clinker, comprising grinding limestone, clay and iron-containing components; homogeneizing the resultant mix; pelletizing the resultant homogeneized mix; decarbonizing the resultant pellets at 800° to 1000° C.; roasting said pellets at 1200° C. to 1350° C.; adding at the grinding or homogeneization stage dust sublimates—wastes of the titanium and magnesium production—in an amount from 0.5 to 6.0% by total weight of raw mix, and, in case the dust sublimates are added at the stage of homogeneization, adding, at the pelletizing stage, an aqueous suspension of cakes—wastes of the titanium and magnesium production—at a volumetric ratio of water to cakes of 3–6:1, in an amount of 10 to 14% by total weight of raw mix.

2. In a process for the production of Portland cement clinker comprising preliminary grinding, homogenizing and pelletizing steps, the improvement which resides in adding at the grinding or homogenizing stage from 0.5 to 6.0% by weight of the total raw mix of a titanium production sublimate waste consisting essentially of mixture of chlorides of a particle size from 10 to 100 μm and have the following composition in % by weight (in terms of oxides and elements).

| | |
|---|---|
| TiO₂ | 2.0–10.0 |
| FeO | 3.0–20.0 |
| Mn | 2.0–5.0 |
| SiO₂ | 4.0–15.0 |
| Al₂O₃ | 2.0–12.0 |
| CaO | 1.0–3.0 |
| MgO | 0.7–4.0 |
| Cr₂O₃ | 1.7–4.0 |
| V₂O₅ | 0.05–4.0 |
| Cl | 11.0–35.0 |
| C | 10.0–25.0 | and in the case where said sublimate waste is added at the homogenization stage further adding at the pelletizing stage from 10 to 14% by weight of the total raw mix of an aqueous suspension of cake-waste of titanium and magnesium production having a volumetric ratio of waste cakes of 3–6:1, said cake consisting essentially of:

| | |
|---|---|
| C | 2.0–6.0% by weight based on dry mass |
| TiO₂ | 10.0–13.0 |
| FeO | 2.0–10.0 |
| Al₂O₃ | 7.0–10.0 |
| SiO₂ | 7.0–30.0 |
| CaO | 15.0–30.0 |
| CaCl₂ | 5.0–13.0 |
| CaCO₃ | 20.0–50.0 |
| MnO | 0.18–30.0 |
| MgO | 5.1–9.0 |
| V₂O₅ | 0.12–0.40 |
| Cr₂O₃ | 0.30–0.80 |
| S | 0.3–1.5 |
| Cl | 3.0–10.0 |
| water | to 100. |

* * * * *